(12) United States Patent
Mysen et al.

(10) Patent No.: US 8,751,427 B1
(45) Date of Patent: Jun. 10, 2014

(54) LOCATION-CENTRIC RECOMMENDATION SERVICE FOR USERS

(75) Inventors: Clarence C. Mysen, San Francisco, CA (US); Johnny Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 698 days.

(21) Appl. No.: 12/984,861

(22) Filed: Jan. 5, 2011

(51) Int. Cl.
*G06F 17/00* (2006.01)
*G06N 5/02* (2006.01)
*G06Q 10/00* (2012.01)
*G06Q 30/00* (2012.01)

(52) U.S. Cl.
USPC .......... 706/46; 705/7.34; 705/14.58; 705/347

(58) Field of Classification Search
None
See application file for complete search history.

(56) References Cited

U.S. PATENT DOCUMENTS

| | | | | |
|---|---|---|---|---|
| 2006/0266830 | A1* | 11/2006 | Horozov et al. | 235/386 |
| 2007/0218900 | A1* | 9/2007 | Abhyanker | 455/435.1 |
| 2008/0015928 | A1* | 1/2008 | Chandra | 705/10 |
| 2008/0243821 | A1* | 10/2008 | Delli Santi et al. | 707/5 |
| 2010/0153292 | A1* | 6/2010 | Zheng et al. | 705/347 |
| 2011/0276565 | A1* | 11/2011 | Zheng et al. | 707/724 |

OTHER PUBLICATIONS

Takeuchi, Yuichiro, and Masanori Sugimoto. "CityVoyager: an outdoor recommendation system based on user location history." Ubiquitous intelligence and computing. Springer Berlin Heidelberg, 2006. 625-636.*

Caron, Jean Olivier, et al. "Groupanizer: a method to correlate multi-users position with daily moments." Pervasive Computing and Communications Workshops, 2006. PerCom Workshops 2006. Fourth Annual IEEE International Conference on. IEEE, 2006.*

Wang, Yuan, Jie Zhang, and Julita Vassileva. "A user-centric approach for social data integration and recommendation." Human-Centric Computing (HumanCom), 2010 3rd International Conference on. IEEE, 2010.*

Yingchen, Xu, et al. "An ontology-based approach for mobile personalized recommendation." Services Science, Management and Engineering, 2009. SSME'09. IITA International Conference on. IEEE, 2009.*

Schafer, J. B., Frankowski, D., Herlocker, J., & Sen, S. (2007). Collaborative filtering recommender systems. In the adaptive web (pp. 291-324). Springer Berlin Heidelberg.*

Zheng, Vincent W., et al. "Collaborative location and activity recommendations with GPS history data." Proceedings of the 19th international conference on World wide web. ACM, 2010.*

(Continued)

*Primary Examiner* — Kakali Chaki
*Assistant Examiner* — Daniel Pellett
(74) *Attorney, Agent, or Firm* — Bracewell & Giuliani LLP

(57) ABSTRACT

Methods, systems, and apparatus, including computer programs encoded on a computer storage medium, for location centric user profiling and services. In one aspect, a method includes accessing historical location data specifying physical locations at which user devices were detected; accessing network data for each of the users of the user devices, the network data for each user indicative of subjective preferences of the user; for each of the users, determining physical locations specified by the location data, determining entities from the physical locations and visited by the user, determining for each entity a satisfaction measure that is indicative of a satisfaction of the user with the entity, and generating a user profile for the user specifying topics that are of interest to the user, the entities having been determined to have been visited by the user, and the satisfaction measures of the entities.

14 Claims, 5 Drawing Sheets

(56) References Cited

OTHER PUBLICATIONS

Zheng, Yu, Xing Xie, and Wei-Ying Ma. "GeoLife: A Collaborative Social Networking Service among User, Location and Trajectory." IEEE Data Eng. Bull. 33.2 (2010): 32-39.*

Adomavicius, Gediminas, et al. "Incorporating contextual information in recommender systems using a multidimensional approach." ACM Transactions on Information Systems (TOIS) 23.1 (2005): 103-145.*

Adomavicius, Gediminas, and Alexander Tuzhilin. "Toward the next generation of recommender systems: A survey of the state-of-the-art and possible extensions." Knowledge and Data Engineering, IEEE Transactions on 17.6 (2005): 734-749.*

Ryu, Sanghyun, et al. "User adaptive recommendation model by using user clustering based on decision tree." Computer and Information Technology (CIT), 2010 IEEE 10th International Conference on. IEEE, 2010.*

'Mountain View Restaurants, Dentists, Bars, Beauty Salons, Doctors.' Yelp [online]. [retrieved on Aug. 10, 2011]. Retrieved from Internet electronic mail: http://www.yelp.com/mountain-view-ca.

'Yelp, Inc.' Yelp, Inc.—Wikipedia, the Free Encyclopedia [online]. [retrieved on Aug. 10, 2011]. Retrieved from Internet electronic mail: http://en.wikipedia.org/wiki/Yelp,_Inc.

'Google Maps.' [online]. [retrieved on Aug. 10, 2011]. Retrieved from Internet electronic mail: http://maps.google.com/.

Citysearch [online] [retrieved on Aug. 10, 2011]. Retrieved from Internet electronic mail: http://webcache.googleusercontent.com/search?q=cache:n8qUVAEZ0skJ:www.citysearch.com/+city+search&cd=2&hl=en&ct=clnk&gl=us&source=www.google.com.

'Citysearch' Wikipedia, the Free Encyclopedia [online]. [retrieved on Aug. 10, 2011]. This page was last modified on Aug. 6, 2011 [retrieved on Aug. 10, 2011]. Retrieved from Internet electronic mail: http://en.wikipedia.org/wiki/City_search.

'Angie's List.' Doctor Reviews & Contractors Ratings—Find a Doctor or General Contractor/Angie's List [online]. [retrieved on Aug. 10, 2011]. Retrieved from Internet electronic mail: http://www.angieslist.com/.

'Angie's List.' Wikipedia, the Free Encyclopedia [online]. This page was last modified on Aug. 3, 2011 [retrieved on Aug. 10, 2011]. Retrieved from Internet electronic mail http://en.wikipedia.org/wiki/Angie%27s_List.

'Foursquare' [online]. 2011 [retrieved on Aug. 10, 2011]. Retrieved from Internet electronic mail https://foursquare.com/.

'Four Square (disambiguation).' Wikipedia, the Free Encyclopedia [online]. [retrieved on Aug. 10, 2011] This page was last modified on Jul. 25, 2011. Retrieved from Internet electronic mail: http://en.wikipedia.org/wiki/Foursquare.

'Yahoo Answers.' Yahoo! Answers—Home [online]. [retrieved on Aug. 10, 2011] Retrieved from Internet electronic mail: http://answers.yahoo.com/.

'Google Answers.' Google Answers: View Questions in Computers [online]. [retrieved on Aug. 10, 2011] Retrieved from Internet electronic mail: http://answers.google.com/answers/browse/1200.html.

* cited by examiner

LOCATION-CENTRIC RECOMMENDATION SERVICE FOR USERS

BACKGROUND

This specification relates to user profile related services.

Gathering recommendation information about local entities, such as local businesses or local recreational areas, is very difficult as current systems typically rely on user reviews. Sometimes only highly trafficked businesses have a sufficient number of user reviews such that an unbiased rating of the business can be derived for making recommendations to users within the location of the local entity. For example, a local business may have a poor rating based on a single review from a first user. A second user cannot reasonably infer if the poor rating is due primarily to the reviewer's bias or due to the poor service from the local business.

Additionally, there are other data from which users may infer a rating. For example, web blogs that include conversation threads may be very informative of the quality of service and products provided by an entity. Likewise, the presence of many users at the entity over a period of time (e.g., heavy foot traffic relative to other the foot traffic of other entities over the same time period) may also be informative of the quality of service and products provided by the entity. However, each of the data sources—reviews, conversations, traffic, and other such data that may indicate the quality or interest of a location within an area—are disparate sources and not explicitly associated. Accordingly, recommendations and ratings cannot not be reasonably inferred, as users cannot associate this data.

SUMMARY

In general, one innovative aspect of the subject matter described in this specification can be embodied in methods that include the actions of accessing historical location data specifying physical locations at which user devices were detected, each user device being associated with a corresponding user of the user device; accessing network data for each of the users, the network data for each user being from a network presence of the user and indicative of subjective preferences of the user; for each of the users: determining physical locations specified by the location data associated with the user device corresponding to the user, determining entities from the physical locations, each of the entities having been determined to have been visited by the user device corresponding to the user, determining, for each of the entities, a satisfaction measure that is indicative of a satisfaction of the user with the entity, and generating from the satisfaction measures and the network data a user profile for the user, the user profile specifying topics that are of interest to the user, the entities having been determined to have been visited by the user device corresponding to the user, and the satisfaction measures of the entities. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Using profile information and location specific data, an advertiser can generate highly localized and highly targeted advertisers to particular users. Using the profile information and location specific data in combination with near real-time information allows a local business to target short duration sales and promotions to improve foot traffic to their businesses. Activity tracking can also be used to notify business owners when their foot traffic is lower or higher than normal levels. The profile information and location specific data can also be used in connection with a question and answer service to facilitate targeting users with specific questions regarding particular topics.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to a system that creates location centric user profiles and provides location centric services. The system accesses data from a variety of sources and for each user determines entities visited by the user. As used herein, an entity specifies a place or thing that is located at a physical location in the world, e.g., based on latitude and longitude coordinates or an address. For example, an entity can be a park, a business, a street, a concert venue, or a sporting venue. Entities are related to physical locations that a user has visited or may visit.

The system determines satisfaction measures for each of the entities visited and identifies topics that are of interest to the user. As used herein, a topic is a feature that is associated with an entity a user visits. For example, the entities "Bar La Grassa" and "Loring Pasta Bar" each have the feature "Italian Restaurant," and the topic of "Italian Restaurants" includes both "Bar La Grassa," and "Loring Pasta Bar." Topics can be determined based on the frequency a user visits an entity associated with the respective feature or based on the number of entities with the same feature that a user visits. Additional features can include the price range of the entity, the atmosphere of the entity, and/or the dress code of the entity, to name a few examples.

The system generates a location centric user profile that specifies the topics that are of interest to the user, the entities visited, and the respective satisfaction measures. The system can use topics to determine an entity that a user may enjoy visiting based on the user visiting other entities that have the same topic.

A user device of a user sends an entity recommendation request to the system, and the system identifies and provides an entity recommendation based on the user's profile to the user device. Alternatively, the system can offer other location centric services such as an entity recommendation for a group of users, or a friend recommendation, to name a few examples.

§1.1 Example Environment

Figure 1:
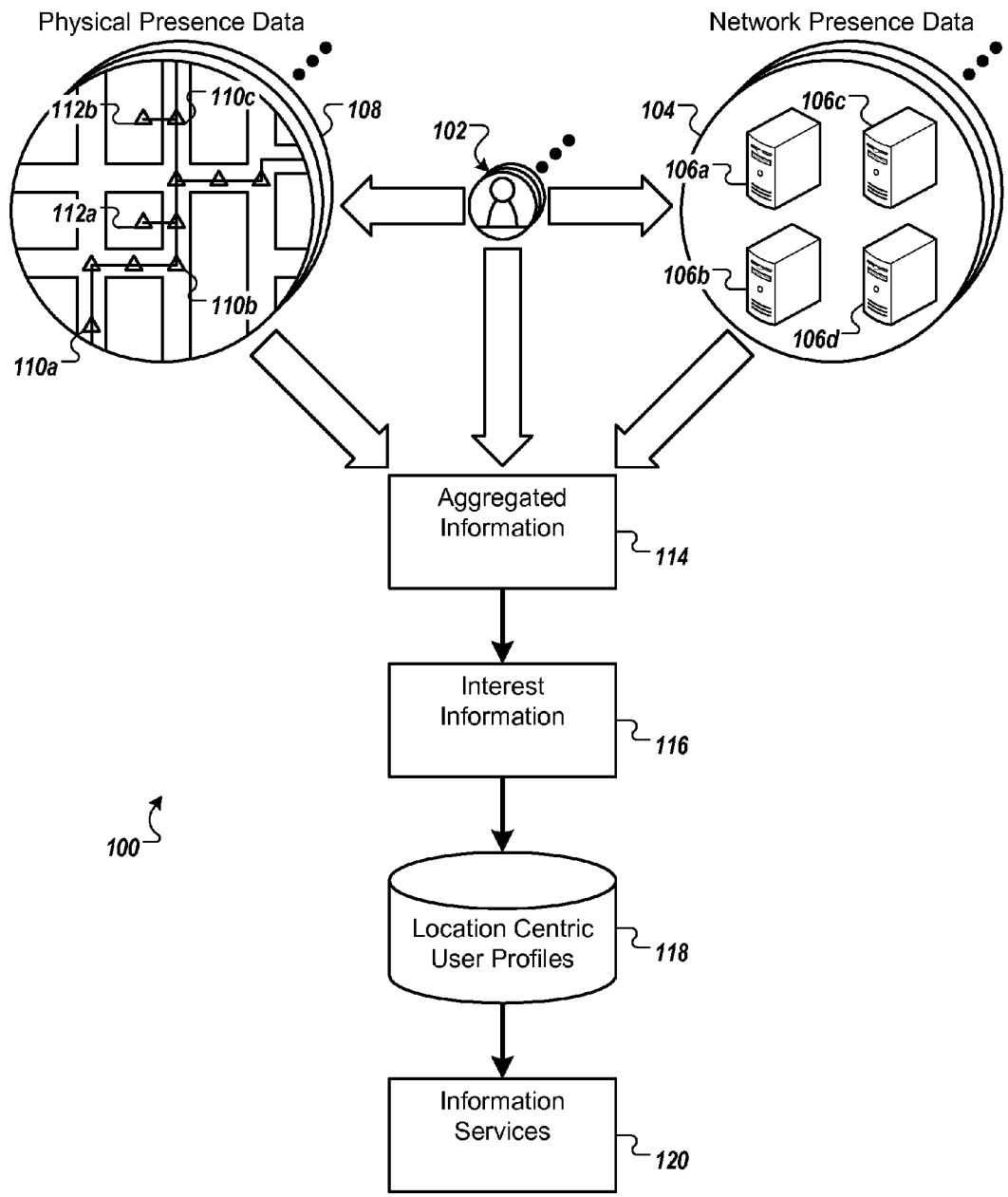
FIG. 1 is a block diagram illustrating a system for generating location centric user profiles and providing location centric services.

FIG. 1 is a block diagram illustrating a system 100 for generating location centric user profiles and providing location centric services. The system 100 provides services, and/or has access to data for services provided to one or more user devices 102 and logs data associated with the user devices 102. Services can include search results, map and direction information, social networking services, email, blogging services, instant messaging, location centric services, and other online services. For example, the system 100 allows a user to post an entry on a blog using one of the user devices 102. The system 100 is implemented in one or more computer devices, such as one or more computers in data communication over a network, and a memory storage system that is in data communication with the computer devices.

The system 100 receives data from and sends data to the user devices 102. The user devices are electronic devices that are under the control of a user and capable of requesting and receiving resources over a network. Example user devices 102 include personal computers, mobile communication devices, and other devices that can send and receive data over a network. As shown in FIG. 1, each stacked representation of user device 102 corresponds to a particular user, and each stacked representation of network presence data 104 and physical presence data 108 corresponds to network presence data 104 and physical presence data 108 for the device associated with the user.

Network presence data 104 for each user associated with a user device 102 is stored in the system 100. The network presence data 104 is from a network presence of the user and indicative of subjective preferences of the user. The network presences includes traffic to and from web sites 106a-106d, conversations such as blog posts and replies, instant messaging sessions, reviews, comments, social networking posts, and/or email conversations that can be associated with users of user devices 102. Such associations are identified by the user of user accounts, user names, e-mail addresses, and the like.

The network presence data 104 can include user settings or a user specified user profile. The user settings and user specified profile can be entered into the network presence data 104 by a user using one of the user devices 102. For example, the user settings can include privacy settings about the types of information logged in the network presence data 104 and how the information can be used, and the user profile can include information that is explicitly specified by users (e.g., names, addresses, etc.) and implicitly derived for users (e.g., topics of interests as learned from web sites 106 visited, etc).

Physical presence data 108 includes data specifying physical locations at which the user devices 102 were detected, where each user device is associated with a corresponding user of the user device. For example, the physical presence data 108 for the first stacked representation of a user device 102 includes data specifying one or more locations 110a-c and one or more locations 112a-b. The locations can be derived from signal magnitude triangulation techniques, Global Positioning System (GPS) tracking data from the user devices 102, data indicating a user "check-in" at an entity, or other data. The locations 110a-c define a physical path taken by a user of one of the user devices 102. For example, the locations 110a-c can be used to determine that a user walked along several city blocks. The locations 112a-b are locations at which a user spent more than a threshold amount of time. For example, the location 112a can be used to determine that a user went to "Bar La Grassa" and then a movie theater, e.g., the location 112b. The physical presence data 108 can include the duration of time spent at the locations 110a-c and the locations 112a-b and/or the frequency of the visits to the locations 110a-c and the locations 112a-b.

The association of the user device 102 and its corresponding network presence data 104 and physical presence data 108 thus provides an overview of a user's physical presence and the user's on-line presence, and from this data information about the users and locations can be derived. As this information may include data the user determines to be sensitive, the system 100, in some implementations, requires that a user specifically opt-in to allow tracking of the network presence data 104 and physical presence data 108. The system 100 also allows the user to permanently delete the associated data at any time.

2.0 Location Centric User Profiles and Services

The system 100 accesses the network presence data 104 and the physical presence data 108, and identifies users associated with the data. For each user, the system 100 generates aggregated information 114 from the identified data associated with the user.

For example, the system 100 identifies a user specified user profile, a user associated with the user specified user profile, and physical presence data associated with a user device of the user. The system 100 can use the user specified user profile or other information about the user to identify conversations, blog posts, visited sites, social network friends list, etc., that is associated with the user.

The system 100 uses the aggregated information 114 to identify entities associated with the aggregated data of a user and user satisfaction measures associated with the entities. Based on the entities and associated satisfaction measures, the system 100 identifies interest information 116 associated with each user. For example, a blog entry can discuss a restaurant that a user recently visited and how much the user enjoyed the service and the food. The system also determines from the physical presence data that the user visits the restaurant frequently, and also visits other restaurants that serve a similar cuisine. The system 100 thus determines that the user has a positive satisfaction measure associated with the restaurant and is likely to visit the same restaurant again or another similar restaurant. Thus, acts of visiting similar places can also be used to create an overall profile.

The system 100 generates location centric user profiles 118 from the aggregated information 114 and the interest information 116 associated with a user. The location centric user profiles 118 include data indicating the entities the user visited, the satisfaction measures associated with the entities, and topics that are of interest to the user.

In some implementations, the system 100 identifies topics for a location centric user profile based on two or more entities associated with the same feature and/or the frequency or duration that an entity or related entities are visited. For example, if a user visits "Bar La Grassa" once a week, the user's profile can include "Italian Restaurants" as a topic of interest. Alternatively, if a user goes hiking once a year in a national park for an extended period, e.g., a week, the user's location centric user profile can include "hiking" as a topic.

The system 100 can include one or more information services 120, such as a place recommender, a real-time activity tracker, a real-time friend finder, a question and answer service, and/or a question and answer server, described in more detail with reference to FIG. 2 below. The information services 120 receive a request from a user of one of the user devices 102, and provide responses to the request based on the user's location centric user profile.

For example, a user can request a restaurant recommendation from the system 100 and based on the user's location centric user profile, and in response, the information services 120 recommends a restaurant that the user is likely to enjoy. In some implementations, the request may specify several users, i.e., a group of users, and the information services 120 can recommend a restaurant to a group of users based on the location centric user profiles of all of the users in the group. For example, a user may send a request for a restaurant to the information services 120, and the request may include a friends list of three friends. The information services 120 takes into account the common interests of the users when making the recommendation.

In some implementations, information services 120 are location centric in that the responses provided to a user are based on the current location of the user. For example, if a user in Washington D.C. requests a restaurant recommendation, the system 100 can provide the user with the recommendation "Filomena Ristorante" (e.g., located in Washington D.C.) based on the location centric user profile indicating that the user likes "Italian Restaurants." However if the same user were in Minneapolis, the system 100 can provide the user with the recommendation "Bar La Grassa" (e.g., located in Minneapolis).

§2.1 Example Implementation

Figure 2:
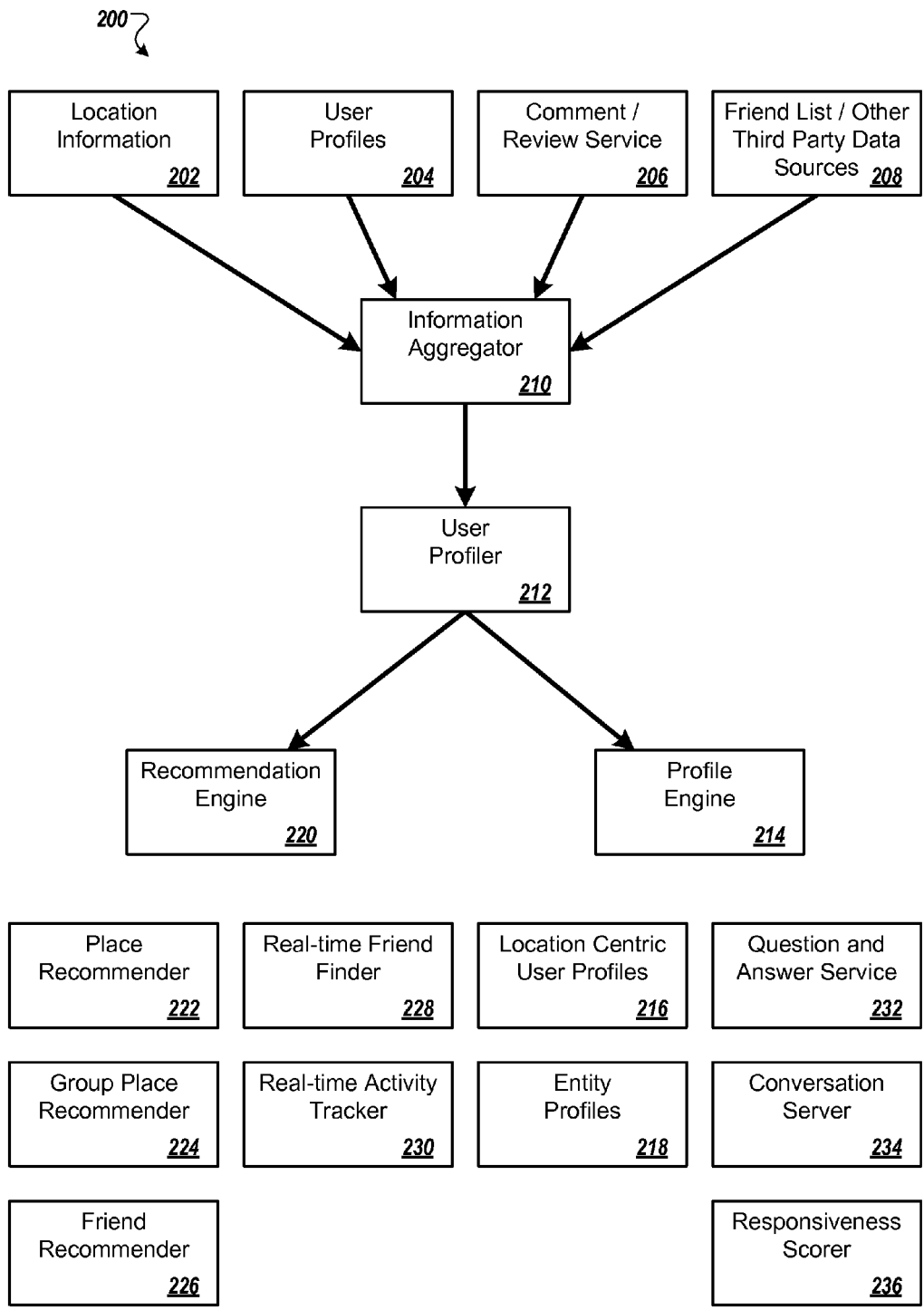
FIG. 2 is a block diagram illustrating an example implementation of a system for generating location centric user profiles and providing location centric services.

FIG. 2 is a block diagram illustrating an example implementation of a system 200 for generating location centric user profiles and providing location centric services. The system 200 accesses data from one or more sources, aggregates the data based on one or more users associated with the data, and generates location centric user profiles for each user. The system 200 receives a request from a user device associated with a user, and based on the user's location centric user profile provides location centric services to the user.

One or more sources of location information 202 provide the system 200 with real time physical location data and location planning data. For example, the physical location data includes physical locations visited by a user and tracked with a user device and/or locations the user visited and commented on, e.g., on a social network. The location planning data can include locations a user is planning to visit, e.g., during a trip.

One or more user profiles 204 provide the system 200 with user specified profile information. For example, the user profiles 204 can include user specified interests, schools attended, favorite places to visit, preferred foods, favorite movies, home and work addresses, and so on.

One or more comment and review services 206 provide the system 200 with comments and reviews written by one or more users. For example, a user can go to "Bar La Grassa" and post a review about the experience afterward.

One or more other third party data sources 208 provide the system 200 with additional information. The other third party data sources 208 can include contacts lists, friends lists (e.g., from an instant messaging service), social networks, business or news websites, or calendar entries. In some implementations, other third party data sources 208 can provide credit card transaction information or email. User privacy settings can indicate the sources the system 200 can access in order to receive data, both in the system 200 and from other third party data sources 208. In some implementations, third party data includes location information and/or user profiles.

The system 200 includes an information aggregator 210 that aggregates, for each user, all data associated with the particular user. The information aggregator 210 aggregates the information associated with a given user and the user's connections (e.g., friends and/or contacts) based on the data received from the sources of the location information 202, the user profiles 204, the comment and review services 206, and the other third party data sources 208.

§2.2 Location Centric User Profiles

The system 200 includes a user profiler 212 that extracts user interests from the aggregated information, generates satisfaction measures, and creates location centric profiles of users and entities. The user profiler 212 identifies user interests, topics, locations, and sentiments, as described in more detail below.

The user profiler 212 determines physical locations specified by the location data associated with a user device corresponding to the user. For example, the user profiler 212 determines that a user visited "800 North Washington Avenue." The user profiler 212 determines entities from the physical locations, each of the entities having been determined to have been visited by the user device corresponding to the user. For example, the user profiler 212 extracts explicit entity names from the aggregated information by finding names in comments, reviews, and other data sources. For example, the user profiler 212 determines that the user posted the comment "I had a great time at Bar La Grassa" shortly after leaving "800 North Washington Avenue."

In some implementations, the user profiler 212 infers entity names based on entity data (e.g., type of entity, services provided, and/or food served), location information associated with a user, and possible references to entities (e.g., shortened business names or business information, such as "the italian restaurant on mission st"). For example, using a user device, a user can search for "the italian restaurant on mission st" and receive a map of search results. Without selecting one of the results, the user visits a restaurant and posts "I had a great time tonight at the Italian restaurant I went to" to a social network. The user profiler 212 can determine that the user visited an Italian restaurant, access the historical physical location data for the user device and determine that one of the physical locations the device visited corresponds to one of the search results provided in response to the query "the italian restaurant on mission st." Based on this information, the user profiler 212 can determine the name of the entity the user visited which corresponds to the conversation "I had a great time tonight at the Italian restaurant I went to."

In some implementations, the user profiler 212 uses only an entity name when determining the physical locations that a user device visited. In some implementations, the user profiler 212 uses an entity name and filters by common physical places visited by a user device corresponding to the user. For example, the user profiler 212 can determine that the user posted the comment "I had a great time at Bar La Grassa" before checking into a social event in Minneapolis and use this information (e.g., the occurrence of a proper noun that is the name of an entity) to determine the physical location visited by the user device. In some implementations, the user profiler 212 can use temporal information about locations visited during the same time frame to determine physical locations visited by a user device associated with a user.

The user profiler 212 determines, for each of the entities associated with a user, a satisfaction measure that is indicative of a satisfaction of the user with the entity. For example, the user profiler 212 can use an expert system, machine learning, or natural language processing to identify user sentiment about the entity.

For each identified occurrence of an entity, the user profiler 212 can perform sentiment detection on the occurrence of the entity to determine a sentiment of the user with respect to the entity. For example, the user profiler 212 can search for words that are commonly used to describe positive or negative sentiment in user conversations regarding the entities, or search for user ratings of the entities. For example, "great food" or "good prices" would indicate positive sentiment and "slow service" or "terrible environment" would indicate negative sentiment.

In some implementations, the user profiler 212 can determine a visit frequency for each entity, where the visit frequency is a measure of the visits to the entity by the user device corresponding to the user. In some implementations, the frequency of visits to similar entities is used to determine a user's sentiment for the entities. For example, if a user visits five Italian Restaurants in a month, the user profiler 212 can determine that the user likes Italian Restaurants (as a topic) and has a positive sentiment for the five Italian restaurants visited.

The user profiler 212 determines the satisfaction measures associated with the entities from the determined sentiments with respect to the entity or proportionally to the visit frequency of the entity. For example, the user profiler 212 can associate a positive satisfaction measure with an entity a user visits frequently or an entity with a positive sentiment, and can associate a negative satisfaction measure with an entity associated with a negative sentiment.

For each user, the user profiler 212 provides the entities and respective satisfaction measures associated with a user to a profile engine 214. The profile engine 214 generates from the satisfaction measures and the network data (e.g., the aggregated data) location centric user profiles 216, where each of the location centric user profiles 216 specifies topics that are of interest to the respective user, the entities determined to have been visited by a user device corresponding to the respective user, and the satisfaction measures of the entities. In some implementations, the user profiler 212 and the profile engine 214 are part of the same module.

The profile engine 214 identifies topics, for example, by identifying the most frequent entity features associated with a user. For example, if a user is associated with the entities "Bar La Grassa," "Loring Pasta Bar," and "Zion National Park," the user's profile can include the topic "Italian Restaurants." The frequency of the entity features can be based on the number of unique entities visited (e.g., no matter how many times a specific entity is visited, the features associated with that specific entity are counted only once) or based on the number of times an entity with the feature is visited (e.g., the features associated with an entity are counted each time the user visits the entity).

In some implementations, the profile engine 214 modifies weights associated with entity features when identifying topics for the location centric user profiles. In some implementations, the weight represent the sentiment of the user. For example, when a user visits "Yosemite" the profile engine 214 can increase the weights associated with the features "hiking," "outdoors," "national parks," "rock climbing," and "California" to different degrees. Similarly, if a blog post of the user includes the text "great hiking," and "camping" then the weights associated with the mentioned features can be increased for the location centric user profile of the user that wrote the blog post and/or users that read the blog post. Conversely, if a blog post mentions "hated hiking", "did not like Yosemite" then the weights associated with the mentioned features can be decrease for the location centric user profile of the user that wrote the blog post. The profile engine 214 can identify topics based on entity features with weight values above a threshold value. Alternatively, the profile engine 214 can select a predetermined number of entity features with the highest weight values when identifying topics for a location centric user profile.

For one or more entities, the profile engine 214 generates one or more entity profiles 218, where the entity profiles 218 specify features that are associated with a respective entity and optionally features of entities that are physically located close to the respective entity. For example, the entity "Bar La Grassa" can have the features "Italian Restaurant" and "N Washington Ave."

In some implementations, the user profiler 212 generates a social graph between profiles in the location centric user profiles 216 based on friends lists, contacts lists, entities visited, topic interests, and/or other location centric user profile information. The social graph can be used by a recommendation engine 220 in order to provide recommendations to users. In some implementations, information from the social graph is also used to provide annotations to recommendations identified by the recommendation engine 220 and the recommendation engine 220. For example, the recommendation can also be provided with information about a user's friend that likes a recommended restaurant, and a list of restaurants for which both the user and the friend have expressed positive feedback (either implicitly or explicitly).

Using this profile data, the system provides various user services, as described in more detail below.

§2.3 Location Centric Recommendation Services

The recommendation engine 220 receives a request from a user device of a user, accesses the location centric user profile of the user in response to the request, and provides a recommendation to the user device based on the type of request and the user's location centric user profile. The recommendation engine 220 can compare the entities, topics, and satisfaction measures in the user's location centric user profile with entities, topics, and satisfaction measures associated with one or more other users (e.g., where the other users are connected to the requesting user in the social graph) in order to identify recommendations. For example, the recommendation engine 220 can perform association analysis or clustering on the location centric user profiles 216, or create classifiers based on the location centric user profiles 216 in order to identify recommendations.

Each of the services 222-232 are part of the recommendation engine 220 and provide specific services to user device. A place recommender 222 recommends locations to a user at which other users having similar interests to the user are or have been located. The place recommender 222 receives an entity recommendation request from a user device, accesses the profile of a user associated with the user of the user device in response to the request, identifies other users that have similar topic interests as the user, identifies entities at which user devices associated with the other users are currently located, and recommends at least one of the identified entities to the user. In some implementations, the place recommender 222 can provide recommendations based on entities frequently visited by users with similar interests as the requesting user. In some implementations, the place recommender 222 provides a list of recommendations in response to an entity recommendation request. For example, the place recommender 222 can identify restaurants frequented by a user, identify other users who frequent the same restaurants, identify another restaurant frequented by the other users but not frequented by the user, and recommend the other restaurant to the user as a place the user might enjoy.

A group place recommender 224 can receive an entity recommendation request specifying two or more users, access the location centric user profiles of each of the two or more users in response to the request, identify a set of group topics from the topics specified by the location centric user profiles of the two or more users, and based on the set of group topics recommend one or more of the identified entities in response to the entity recommendation request.

For example, the group place recommender 224 can identify a list of entity recommendations for each of the two or more users, create a model of the entity recommendations, and weight the recommendations based on the satisfaction measures of the two or more users. The group place recommender 224 can add negative weights to entity recommendations associated with a negative satisfaction measure of an entity or topic for one of the two or more users, rank the entity recommendations based on the weights, and provide one or more entity recommendations that do not have a negative weight in response to the request. In some implementations, if all of the entity recommendations are associated with a negative weight, the group place recommender 224 provides the highest ranked entity recommendation in response to the request.

The friend recommender 226 matches users to other users based on common entity and topical interests. For example, the friend recommender 226 can receive a friend recommendation request and compare the location centric user profile of the requesting user to one or more location centric user profiles of other users. The friend recommender 226 can identify another user that is within a threshold distance of the requesting user (e.g., both users are or will be in the same city), determine that both users have one or more entity and/or topic interests in common based on the respective location centric user profiles, and provide a friend recommendation with information about the other user to the requesting user.

In some implementations, the friend recommender 226 uses a social graph that connects the requesting user and the identified other user to identify annotations to provide with the friend recommendation. For example, the friend recommender 226 can include "James likes hiking and Italian Restaurants" in the friend recommendation to indicate why the other user is a suggested friend for the requesting user.

A real-time friend finder 228 provides a similar service as the friend recommender 226; however the real-time friend finder 228 provides recommendations to users who desire to meet with others at a more immediate time (e.g., within the next half an hour) than the friend recommender 226. The real-time friend finder 228 can take advantage of trends generated by real-time activity when providing recommendations. For example, the real-time friend finder 228 can make recommendations based on the location centric user profiles of users already or recently at an entity.

In some implementations, the friend recommender 226 or the real-time friend finder 228 can be used to find entities commonly frequented by users with similar interests. In some implementations, the friend recommender 226 or the real-time friend finder 228 can make a recommendation based on the number of people at a location, trends in user activity, or friends who are or have recently been at a location.

A real-time activity tracker 230 receives an entity trend request from a user, accesses the location centric user profile of the user in response to the request, identifies other users that have similar topic interests as the user, identifies entities at which a minimum number of user devices associated with the other users are determined to have visited within a recent time period, and recommends at least one of the identified entities to the user.

For example, the real-time activity tracker 230 allows users to determine when entities are busy and the types of people at the entity. The real-time activity tracker 230 can keep a timeline of users visiting an entity in a database and allow other users to query the database to find out historical information about the entity. The real-time activity tracker 230 can anonymize the data in the database in order to protect user privacy. The historical information can include trending popularity, estimated number of visitors, interests of visitors, and/or comparisons to historical patterns (is volume higher or lower than normal). To illustrate, a user may desire to go to any social gathering location at which other users with similar interests are located. The real-time activity tracker 230 accesses the user's profile and the profiles of other users that are congregating at different locations, determines which locations have many other users with predominantly similar interests, and recommends those locations to the user.

§2.4 Question and Answer Services

The question and answer service 232 receives a question regarding an entity from a user, accesses the profile of the user in response to the request, identifies other users that have similar topic interests as the user, and facilitates a communication between the user and at least one of the other identified other users. In some implementations, the question and answer service 232 receives a question regarding a topic that is not associated with a specific entity. For example, the question and answer service 232 can receive the question "What are some good places to go hiking in Utah?" from a user.

The question and answer service 232 can receive a question from a user and identify a list of candidate respondents. The question and answer service 232 can narrow the list to potential respondents who have a relevant physical location (e.g., based on geographic distance matching), similar topical interests that align with the question, and/or are socially connected to the requesting user. In some implementations, the list is narrowed based on the responsiveness of the potential respondents in replying to questions. The resulting potential respondents can be weighed based on the narrowing criteria and the question can be sent to the relevant potential respondents.

The questions, answers, and any additional conversations are stored on a conversation server 234 for later aggregation by the information aggregator 210 and updating of the relevant location centric user profiles. The information stored on the conversation server 234 is indexed so that other users can search for answers to questions. In some implementations, privacy settings associated with the location centric user profiles of the requesting user and the respondents determine if the question and answer conversation are stored on the conversation server 234 and/or how the system 200 anonymizes the data stored in the conversation server 234.

A responsiveness scorer 236 determines response measures for the location centric user profiles 216 based on the likelihood of a user responding to questions. The responsiveness scorer 236 tracks the number of responses to a question, the quality of the responses from a user based on who asked the question (e.g., a friend or a stranger), the topic, the physical location of the requesting user and the respondents, and other features in order to determine a response measure adjustment for each of the respondents. For example, users who rarely respond to highly relevant questions (e.g., based on the user's location centric user profile) have a negative value added to their response measure and users who do not show topical interest or interest in users beyond their friends are demoted accordingly, e.g., by a smaller negative value. Quality can, for example, be measured by user votes, e.g., a user's response to "Was this reply helpful?" When a user's response measure falls below a threshold value, the question and answer service 232 no longer sends questions to that user, or reduces the number of questions that are sent to that user.

In some implementations, the location centric user profiles can be associated with two response measures, one for people they are connected to (e.g., with a friends or contacts list) and one for people they are not connected to. The responsiveness scorer 236 can adjust the respective response measure when a user is provided a question by the question and answer service 232.

In some implementations, an entity can provide compensation to the system 200 to be selected as a respondent for the question an answer service 232. For example, the entity can select to answer topically relevant questions based on the entity being selected as a local topical authority for the question.

§3.0 Example User Profile

Figure 3:
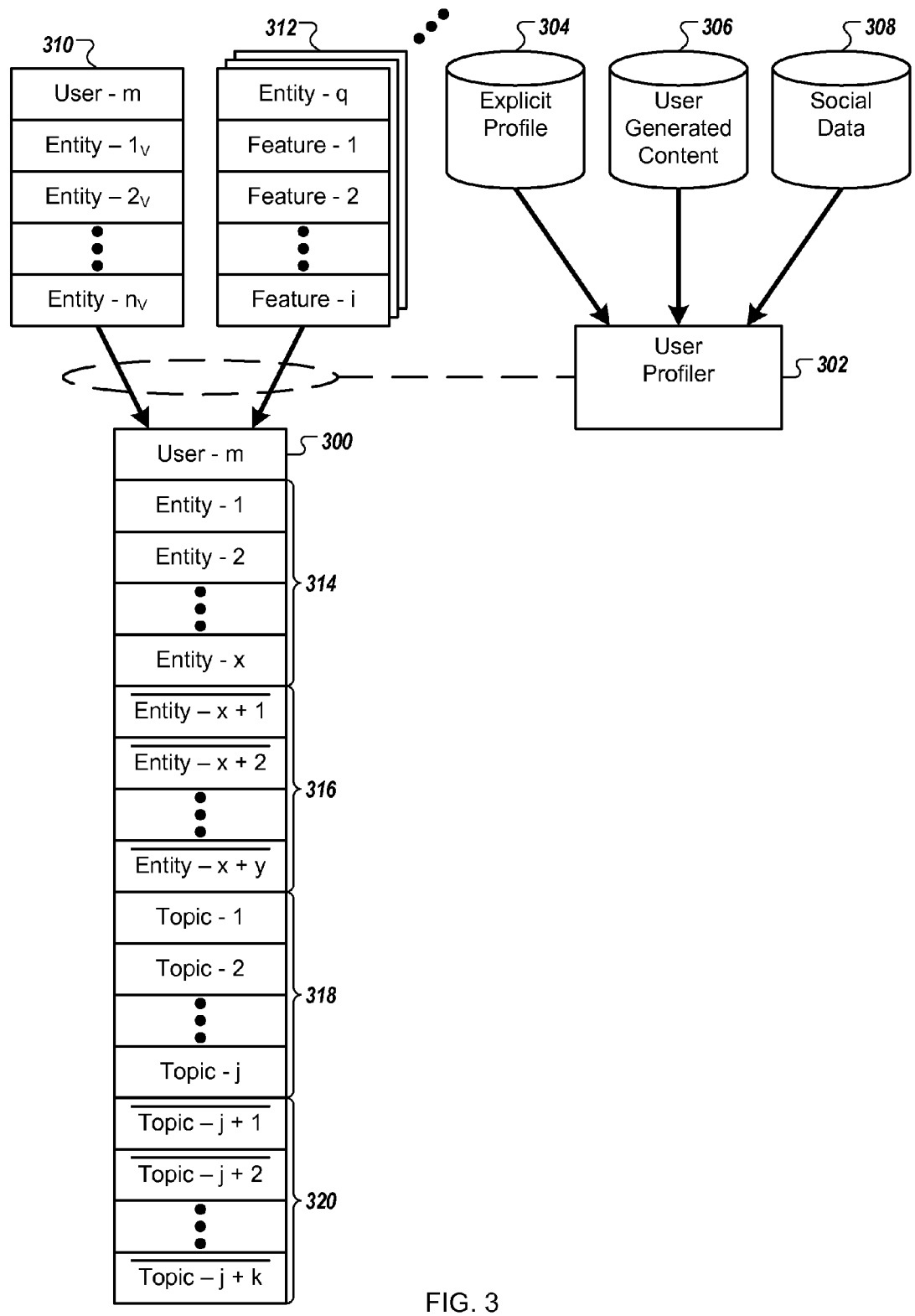
FIG. 3 is a block diagram of a location centric user profile.

FIG. 3 is a block diagram of a location centric user profile 300. A user profiler 302 generates the location centric user profile 300 from an explicit profile 304, user generated content 306, and/or social data 308. The explicit profile 304, the user generated content 306, and the social data 308 can be from the same system as the user profiler 302, from third party sources, or both. The data representation is illustrative only, and other data structures that realize the functionalities described below can also be used.

For a user m, the user profiler 302 identifies user information 310 from the explicit profile 304, the user generated content 306, and the social data 308 that indicate one or more entities (e.g., "entity $1_V$," "entity $2_V$," through "entity $n_V$") that the user m visited. These data are collected from the network presence data 104 and the physical presence data 108 associated with the user m. The user profiler 302 determines satisfaction measures that are indicative of a satisfaction of the user with the respective entities. For example, the user profiler 302 analyzes the user generated content 306 and the social data 308 for user reviews, user sentiment information, visit frequency, etc., associated with the entities the user m visited.

For one or more of the n entities, the user profiler 302 identifies (or generate) entity profiles 312 that include features associated with the respective entity. For example, the user profiler 302 can generate an entity profile for an entity q based on the features (e.g., "feature 1," "feature 2," through "feature i") associated with the entity q. The features can include one or more topics (e.g., "Italian Restaurant" or "hiking") associated with the entity, the price range of the entity, a demographics of people that frequent the entity (e.g., male, female, age range, etc.), the physical location of the entity, and/or user reviews of the entity, to name a few examples.

The user profiler 302 generates the location centric user profile 300 from the user information 310, the entity profiles 312, and the user satisfaction measures associated with the n entities visited. The location centric user profile 300 includes information about the entities "entity $1_V$" through "entity $n_V$" from the user information 310 and the associated satisfaction measures. For example, the user profiler 302 can determine that one or more positive entities 314 (e.g., "entity 1," "entity 2," through "entity x") are associated with positive satisfaction measures and zero or more negative entities 316 (e.g., "entity x+1," "entity x+2," through "entity x+y") are associated with negative satisfaction measures, as indicated by the bar above the entity names. For example, the user profiler 302 can determine that the user m had positive experiences at "entity $1_V$" and "entity $n_V$" and include "entity $1_V$" and "entity $n_V$" in the positive entities 314, and that the user m had a negative experience at "entity $2_V$" and include "entity $2_V$" in the negative entities 316.

The user profiler 302 can identify one or more positive topics 318 (e.g., "topic 1," "topic 2," through "topic j") that the user m is interested in based on the feature values associated with the positive entities 314. For example, the user profiler 302 can determine that "entity 1" is "Loring Pasta Bar" and "entity 2" is "Bar La Grassa" and based on the positive satisfaction measures associated with the entities determine that the user is interested in "Italian Restaurants" (e.g., "topic 1"). The system can use the satisfaction measures of the entities to determine satisfaction measures associated with the topics.

Similarly, the user profiler 302 can identify zero or more negative topics 320 (e.g., "topic j+1," "topic j+2," through "topic j+k") based on topics associated with the negative entities 316. The user profiler 302 does not include any of the positive topics 318 in the negative topics 320 list. For example, the user m may have a bad experience with two Italian restaurants buy may enjoy eating Italian food overall, as specified by the positive topics 318.

In some implementations, the user profile 300 is aggregating across multiple other user profiles to reduce noisy information. For example, aggregating across multiple users can help identify entity information that should not be included in a user's location centric user profile, e.g., when a user visits an entity once that users with similar topical interests have not visited. For example, if the data from the user profile 300 is aggregated with data from other user profiles, topics or entities that are unique to a user are identified as possibly noisy data. They system then processes the potentially noisy data to determine whether to include the data in the profile 300. One way of verifying noisy data is checking for the occurrence of uncorrelated data in the user profile, i.e., the absence of other associated data. For example, a user may have visited a curio store one time in the last year, and there is no other physical presence data or network presence data related to the store. Furthermore, no other users with predominately similar interests visited the store. The system then determines that the data for the curio store is uncorrelated with other interest data, and classifies it as noise. Conversely, if the user profile includes correlated data, such as several blog entries that indicate a strong sentiment of like or dislike, the system determines that the data for the curio store is correlated with other interest data, and corresponding profile data is stored in the user profile 300.

Once the profile 300 is created, the system uses the profile of the user, and the profiles of other users and entities, to provide the services described above.

§3.1 Optional Implementation Features

In some implementations, the location information 202 includes information gathered after a user visited an entity. For example, the location information 202 can include data related to coupon redemption, or user "check-in" to an entity after the user visited the entity, rewards/loyalty program purchases, etc., provided the entities provide the data to the system, and provided the user approves of the provisioning of such data.

In some implementations, the system 200 can use Markov models or standard classifiers to predict the locations that the user is likely to visit. For example, the system 200 can predict physical locations that a user is likely to visit based on the current physical location of a user device associated with the user, previous locations of the user device, and/or paths taken by the user device. The predicted path can be included in the location information 202 for making recommendations.

In some implementations, the information aggregator 210 gathers data into three categories: user entered data, inferred data, and third party data. Categorizing the data can help the user profiler 212 to generate the location centric user profiles 216 to identify user topical interests. For example, user entered data can include static information about a user such as the data received from the user profiles 204. Inferred data can, for example, include entities frequently visited by a user as determined based on the data from the sources of location information 202. The information aggregator 210 can use GPS coordinates to identify locations the user visits, and use reverse geo-coding to infer the entities the user visits and the durations of the visits. The third party data can, for example, include the data from the comment and review services 206 and the other third party data sources 208.

In some implementations, the user profiler aggregates data across time. For example, the user profiler accesses network data from multiple different days (e.g., a month) when generating a location centric user profile in order to improve the location centric user profile (e.g., by identifying entities a user visited multiple times during the month). The aggregation can be time limited, e.g., a rolling window of one month, one quarter, or one year. In some implementations, multiple profiles based on different time windows can be used for a user so the system can model current interests and long-term interests.

In some implementations, the user profiler 212 identifies correlations between users based on user topical interests, and/or user devices following similar physical paths. The user profiler 212 can use the correlations when generating the location centric user profiles for the users with similar topical interests and/or similar physical paths to aggregate data across multiple users.

In some implementations, the user profiler 212 uses clustering or an expert system during generation of the location centric user profiles 216. For example, an expert system can use hand coded rules to create the location centric user profiles 216. In some implementations, the user profiler 212 can use manual labeling of data during extraction of topical interests from the aggregated data. In some implementations, the user profiler 302 uses probabilistic latent semantic analysis (PLSA) or latent Dirichlet allocation (LDA) to extract topics from the user information 310.

In some implementations, the user profiler 212 uses agglomerative clustering or probabilistic clustering for identifying relationships between locations. For example, the user profiler 212 can use Bayesian clustering or Gaussian mixture modeling to identify relationships between locations and extract the features of related locations. In some implementations, the user profiler 212 uses a topic modeling algorithm in order to identify relationships between locations.

In some implementations, the user profiler 212 can cluster entities and use a pattern of correlations between the clustered entities to identify topics for a location centric user profile. For example, the user profiler 212 can cluster on locations of entities visited for a single user or a group of users (e.g., friends) and identify correlations between the features of the entities in order to determine topics for the location centric user profiles of the group of users.

In some implementations, the system 200 uses agglomerative clustering or k-nearest neighbor clustering tools for grouping users and/or finding users with similar interests. In some implementations, the user profiler 212 uses classification or association analysis algorithms during generation of the location centric user profiles 216.

In some implementations, a user or the user's friend/contacts can view portions of the user's location centric user profile, provide the user has allowed such access to the profile. The location centric user profile can provide additional information about the user in addition to information in a user specified user profile. For example, a friend of the user can view the user's location centric user profile to determine where the user shops and the interests of the user when deciding what gift to purchase for the user.

In some implementations, the system can use credit card information associated with a user to determine user interests and sentiment, provided the user has approved of access to this information. For example, if a user tips more than ten percent on services from an entity, the system can determine that the user had a positive experience at the entity, and if a user tips less than ten percent, the system can determine that the user had a bad experience at the entity.

In some implementations, the system can use credit card information to infer a price range for an entity and/or the products or services offered by the entity, and infer a shopping price range for particular users. For example, the system can aggregate entity information across time and multiple users, and identify the types of products or services offered by an entity. The system can use the product and/or service information to determine the price range for the entity. For example, the system can identify an entity as a restaurant and the average price of appetizers, side dishes, beverages, and entrees.

In some implementations, the system 200 uses the location centric user profiles 216 when identifying search results or advertisements to send to a user device associated with a respective user. For example, the system 200 can use the physical location of a device associated with a user to provide advertising to the user device based on the user's location centric user profile and the physical location of the user device.

In some implementations, the system provides localized advertising to a user when providing the entity recommendation. For example, the system uses the current physical location of a user device associated with a user and the user's location centric user profile to provide the user device with a restaurant recommendation and advertising for an entity physically located close to the physical location of the user device.

In some implementations, historical information can be used by advertisers to help target advertising to interested users that visit or request information about an entity. In some implementations, historical information can be used by merchants to determine activity at competitor's entities. For example, the real-time activity tracker 230 can determine that user traffic in an entity is slower than normal and notify an employee at the entity. The notification can indicate current user trends (e.g., where users are currently going) and the entity can use the information to increase traffic (e.g., by providing a targeted promotion).

§4.0 Example Process Flows

Figure 4:
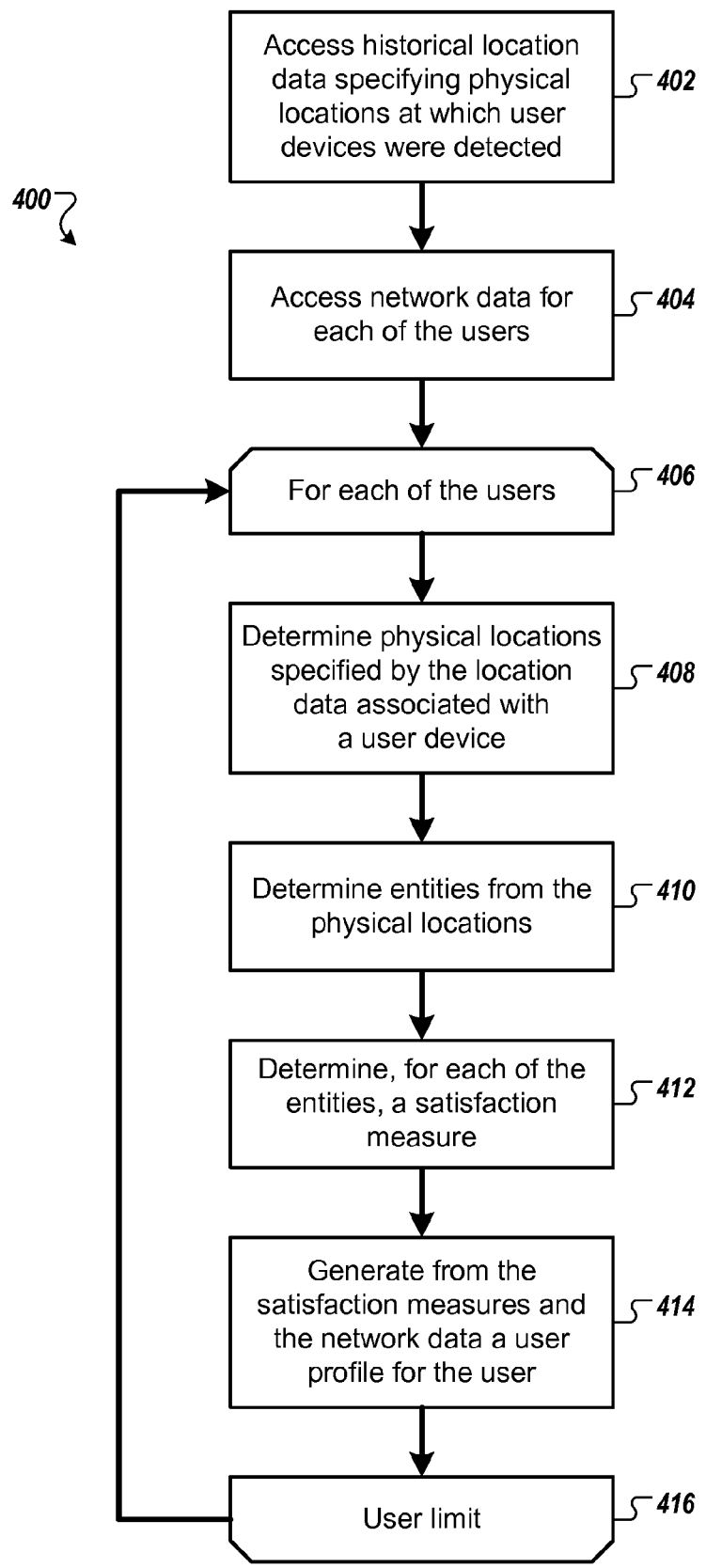
FIG. 4 is flow diagram of an example process for generating a location centric user profile.

FIG. 4 is flow diagram of an example process 400 for generating a location centric user profile. The process 400 can be used by the system 200 to generate the location centric user profiles 216 for users who interact with the system 200.

The system accesses historical location data specifying physical locations at which user devices were detected (402). Each user device is associated with a corresponding user of the user device. For example, the physical location information includes data indicating physical locations visited by user devices associated with corresponding users. The data can be GPS coordinates, cellular tower triangulation information, user "check-in" at an entity, or third party location information (e.g., user opt-in information from a travel agency).

The system accesses network data for each of the users (404). The network data for each user is from a network presence of the user and indicative of subjective preferences of the user. For example, the network data includes user specified user profiles, user reviews or comments, social networking information, or information from third parties.

The system, for each of the users (406), determines physical locations specified by the location data associated with a user device (408), where the user device corresponds to the user. For example, the system determines the physical locations that a specific user visited, where the physical locations are specified by the location data associated with a user device of the specific user.

The system determines entities from the physical locations (410), where each of the entities has been visited by the user device corresponding to the user. For example, the system uses reverse geo-coding to infer the entities that the user visited.

The system determines, for each of the entities, a satisfaction measure associated with the entity (412). For example, the system analyzes the network data, e.g., user conversations, to determine if the user had a positive or negative experience at the respective entity and associates a satisfaction measure based on the experience with the entity.

The system generates from the satisfaction measures and the network data, a user profile for the user (414). The user profile specifies topics that are of interest to the user, the entities having been determined to have been visited by the user device corresponding to the user, and the satisfaction measures of the entities. For example, the system determines topics that have positive and negative satisfaction measures for the specific user based on positive and negative satisfaction measures associated with entities the user visited.

If the system has generated a location centric user profile for all users, then the user limit (416) is achieved, and the process 400 ends. Otherwise, the process 400 continues for the next user (406).

The order of steps in the process 400 described above is illustrative only, and generation of location centric user profiles can be done in different orders. For example, while the process 400 above describes accessing historical location data and then accessing network data, the process 400 can be modified so that the process 400 accesses network data and then accesses historical location data.

In some implementations, the process 400 can include additional steps or some of the steps of the process 400 can be divided into multiple steps, as described above with reference to FIG. 2. For example, the process 400 can perform sentiment detection on each occurrence of an entity in order to determine a sentiment of the specific user with respect to the entity and determine a satisfaction measure based on the sentiment of the user with respect to the entity.

Figure 5:
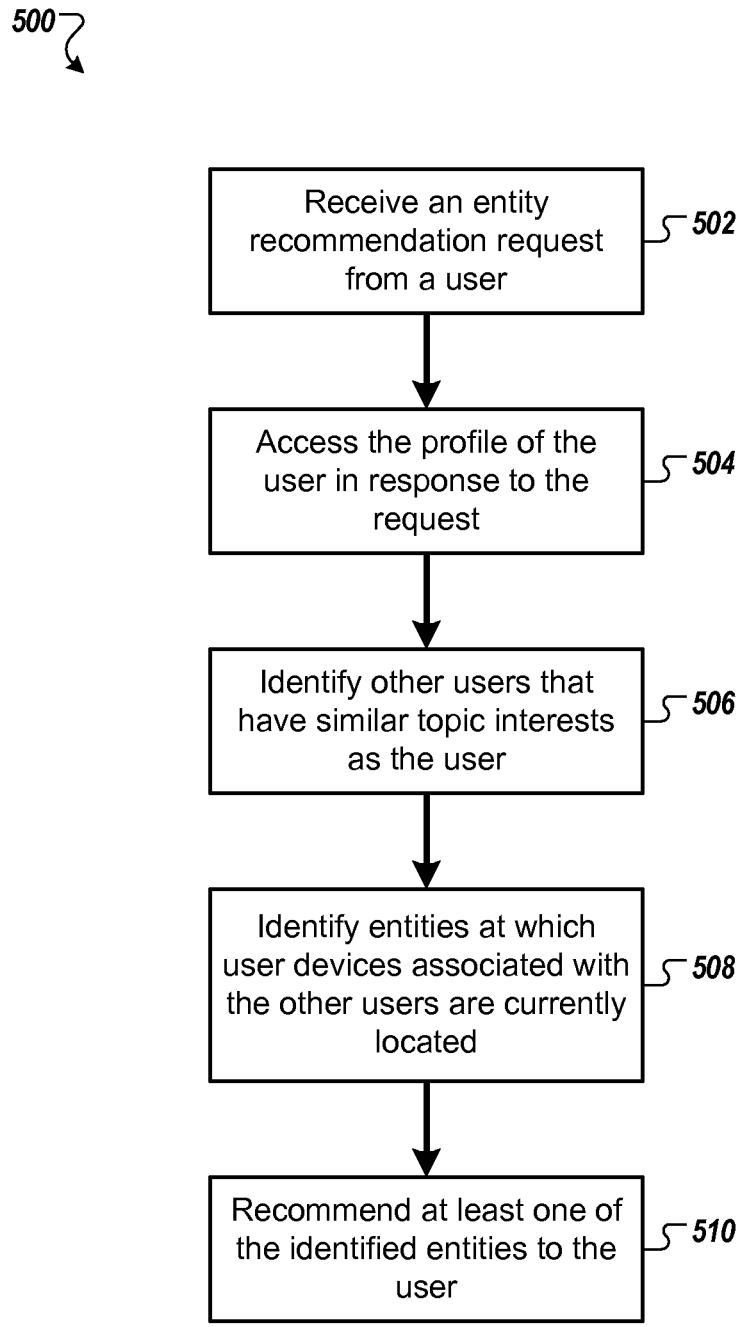
FIG. 5 is flow diagram of an example process for generating an entity recommendation.

FIG. 5 is flow diagram of an example process 500 for generating an entity recommendation. The process 500 can be used by the system 100 to generate an entity recommendation in response to an entity recommendation request received from one of the user devices 102.

The system receives an entity recommendation request from a user (502). For example, the system receives a request for a restaurant recommendation from a user device associated with the user.

The system accesses the profile of the user in response to the request (504). For example, the system identifies the user based on the user device and accesses the location centric user profile of the user.

The system identifies other users that have similar topic interests as the user (506). For example, when the location centric user profiles are connected with a graph, the system follows a path between the user's topic and entity interests to identify other users with similar topic and entity interests. In some implementations, the system disregards the location centric user profiles of user's that are interested in topics and/or entities that the user does not like (e.g., as indicated by negative satisfaction measures).

The system identifies entities at which user devices associated with the other users are currently located (508). For example, the system accesses the location information in order to identify entities that the user may be interested in that one or more of the other users are currently visiting.

The system recommends at least one of the identified entities to the user (510). For example, the system sends a message to the user device recommending one of the identified entities. Alternatively, the system can provide the user device with a list of identified entities (e.g., all of the identified entities, or a threshold number of the identified entities).

In some implementations, for stages 506 and 508, the system identifies other users who are or were physically located in the same physical location as the requesting user (e.g., the same city block or neighborhood) and have some of the same interests as the requesting user. The system identifies entities at which user devices associated with the other users visited in the past or entities determined to be associated with a positive satisfaction measure for the other users' location centric user profiles. For example, the system can recommend a type of entity that a majority of the other users rated positively. For example, for a restaurant search, the system identifies users with similar interests who ate in the same area, and that tended to enjoy a particular set of restaurants, and provides the recommendation "Users who ate in your area with roughly your interests tended to like Restaurants X and Y the most."

§5.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A system, comprising:
a data processing apparatus;
a memory storing instructions executable by the data processing apparatus and that upon execution cause the data processing apparatus to perform operations comprising:
accessing historical location data specifying physical locations at which user devices were detected, each user device being associated with a corresponding user of the user device;
accessing network data for each of the users, the network data for each user being from a network presence of the user and indicative of subjective preferences of the user;
for each of the users:
determining physical locations specified by the location data associated with the user device corresponding to the user;
determining entities from the physical locations, each of the entities having been determined to have been visited by the user device corresponding to the user;
determining, for each of the entities, a satisfaction measure that is indicative of a satisfaction of the user with the entity; and
generating from the satisfaction measures and the network data a user profile for the user, the user profile specifying topics that are of interest to the user, the entities having been determined to have been visited by the user device corresponding to the user, and the satisfaction measures of the entities;
receiving an entity recommendation request from a user;
accessing the profile of the user in response to the request;
identifying other users that have similar topic interests as the user;
identifying entities at which user devices associated with the other users are currently located; and
recommending at least one of the identified entities to the user based on the profile of the user and the profile of the other users.

2. The system of claim 1, wherein the instructions upon execution cause the data processing apparatus to perform operations comprising:
receiving an entity recommendation request from a user;
determine the location of the user;
accessing the profile of the user in response to the request;
identifying other users that have similar topic interests as the user and that are or were in the location of the user;
identifying entities near the location of the user;
recommending at least one of the identified entities to the user based on the profile of the user and the profile of the other users.

3. The system of claim 1, wherein the instructions upon execution cause the data processing apparatus to perform operations comprising:
receiving an entity trend request from a user;
accessing the profile of the user in response to the request;
identifying other users that have similar topic interests as the user;
identifying entities at which a minimum number of user devices associated with the other users are determined to have visited within a recent time period; and
recommending at least one of the identified entities to the user.

4. The system of claim 1, wherein the instructions upon execution cause the data processing apparatus to perform operations comprising:
receiving a question regarding an entity from a user;
accessing the profile of the user in response to the request;
identifying other users that have similar topic interests as the user; and
facilitating a communication between the user and at least one of the identified other users.

5. The system of claim 1, wherein the instructions upon execution cause the data processing apparatus to perform operations comprising:
receiving an entity recommendation request specifying two or more users;
accessing the profiles of each of the two or more users in response to the request;
identifying a set of group topics from the topics specified by the profiles of the two or more users;
recommending, based on the set of group topics, one or more of the identified entities in response to the entity recommendation request.

6. The method of claim 5, wherein identifying a set of group topics from the topics specified by the profiles of the two or more users comprises identifying topics that are commonly specified by each user profile.

7. The system of claim 1, wherein the instructions upon execution cause the data processing apparatus to perform operations comprising:
receiving a request for a gift recommendation from a friend of the user;
accessing the profile of the user in response to the request;
providing a gift recommendation based on the topics and the entities specified by the user profile.

8. The system of claim 1, wherein determining, for each of the entities, a satisfaction measure that is indicative of a satisfaction of the user with the entity comprises:
obtaining a payment for a service provided by the entity;
identifying a tip percentage from the payment;
comparing the tip percentage to a tip threshold;
determining a positive satisfaction measure if the tip percentage is above the tip threshold;
determining a negative satisfaction measure if the tip percentage is below the tip threshold.

9. A method performed by a data processing apparatus, comprising:
accessing historical location data specifying physical locations at which user devices were detected, each user device being associated with a corresponding user of the user device;
accessing network data for each of the users, the network data for each user being from a network presence of the user and indicative of subjective preferences of the user;
for each of the users:
determining physical locations specified by the location data associated with the user device corresponding to the user;
determining entities from the physical locations, each of the entities having been determined to have been visited by the user device corresponding to the user;
determining, for each of the entities, a satisfaction measure that is indicative of a satisfaction of the user with the entity; and
generating from the satisfaction measures and the network data a user profile for the user, the user profile specifying topics that are of interest to the user, the entities having been determined to have been visited by the user device corresponding to the user, and the satisfaction measures of the entities;

receiving an entity recommendation request from a user;

accessing the profile of the user in response to the request;

identifying other users that have similar topic interests as the user;

identifying entities at which user devices associated with the other users are currently located; and recommending at least one of the identified entities to the user.

10. The method of claim 9, wherein the instructions upon execution cause the data processing apparatus to perform operations comprising:

receiving an entity trend request from a user;

accessing the profile of the user in response to the request;

identifying other users that have similar topic interests as the user;

identifying entities at which a minimum number user devices associated with the other users are determined to have visited within a recent time period; and recommending at least one of the identified entities to the user.

11. The method of claim 9, wherein the instructions upon execution cause the data processing apparatus to perform operations comprising:

receiving a question regarding an entity from a user;

accessing the profile of the user in response to the request;

identifying other users that have similar topic interests as the user; and facilitating a communication between the user and at least one of the identified other users.

12. The method of claim 9, wherein the instructions upon execution cause the data processing apparatus to perform operations comprising:

receiving an entity recommendation request specifying two or more users;

accessing the profiles of each of the two or more users in response to the request;

identifying a set of group topics from the topics specified by the profiles of the two or more users;

recommending, based on the set of group topics, one or more of the identified entities in response to the entity recommendation request.

13. The method of claim 9, wherein identifying a set of group topics from the topics specified by the profiles of the two or more users comprises identifying topics that are commonly specified by each user profile.

14. A computer storage medium encoded with a computer program, the program comprising instructions that when executed by data processing apparatus cause the data processing apparatus to perform operations comprising:

accessing historical location data specifying physical locations at which user devices were detected, each user device being associated with a corresponding user of the user device;

accessing network data for each of the users, the network data for each user being from a network presence of the user and indicative of subjective preferences of the user;

for each of the users:

determining physical locations specified by the location data associated with the user device corresponding to the user;

determining entities from the physical locations, each of the entities having been determined to have been visited by the user device corresponding to the user;

determining, for each of the entities, a satisfaction measure that is indicative of a satisfaction of the user with the entity; and generating from the satisfaction measures and the network data a user profile for the user, the user profile specifying topics that are of interest to the user, the entities having been determined to have been visited by the user device corresponding to the user, and the satisfaction measures of the entities;

receiving an entity recommendation request from a user;

accessing the profile of the user in response to the request;

identifying other users that have similar topic interests as the user;

identifying entities at which user devices associated with the other users are currently located; and recommending at least one of the identified entities to the user.

* * * * *